United States Patent [19]
Stine et al.

[11] Patent Number: 6,085,606
[45] Date of Patent: *Jul. 11, 2000

[54] MECHANICAL TRANSMISSION WITH REDUCED RATIO STEPS IN UPPER TRANSMISSION RATIOS

[75] Inventors: Alan C. Stine; Timothy J. Morscheck, both of Kalamazoo; Douglas A. Hughes, Wixom, all of Mich.

[73] Assignee: Eaton Corporation, Cleveland, Ohio

[*] Notice: This patent issued on a continued prosecution application filed under 37 CFR 1.53(d), and is subject to the twenty year patent term provisions of 35 U.S.C. 154(a)(2).

[21] Appl. No.: 09/185,131

[22] Filed: Nov. 3, 1998

[51] Int. Cl.⁷ ................................................. F16H 3/08
[52] U.S. Cl. ............................................. 74/331; 74/360
[58] Field of Search .............................. 74/325, 331, 335, 74/336 R, 360

[56] References Cited

U.S. PATENT DOCUMENTS

| | | |
|---|---|---|
| 4,038,882 | 8/1977 | Keller .......................................... 74/331 |
| 4,081,065 | 3/1978 | Smyth et al. . |
| 4,361,060 | 11/1982 | Smyth . |
| 4,595,986 | 6/1986 | Daubenspeck . |
| 4,614,133 | 9/1986 | Nerstad et al. ....................... 74/360 X |
| 4,648,290 | 3/1987 | Dunkley et al. . |
| 4,722,248 | 2/1988 | Braun . |
| 4,754,665 | 7/1988 | Vandervoort ........................... 74/331 X |
| 4,777,837 | 10/1988 | Lehle ........................................ 74/360 |
| 4,788,889 | 12/1988 | Davis et al. ........................... 74/331 X |
| 4,850,236 | 7/1989 | Braun ........................................ 74/337 |
| 4,873,881 | 10/1989 | Edelen et al. . |
| 4,876,924 | 10/1989 | Fletcher et al. ....................... 74/331 X |
| 5,117,702 | 6/1992 | Rodeghiero et al. ................. 74/360 X |
| 5,385,066 | 1/1995 | Braun ....................................... 74/331 |
| 5,390,561 | 2/1995 | Stine ........................................ 74/331 |
| 5,394,772 | 3/1995 | Stine et al. ............................ 74/331 X |
| 5,403,249 | 4/1995 | Slicker . |
| 5,406,861 | 4/1995 | Steeby et al. . |
| 5,421,222 | 6/1995 | Stine et al. ............................ 74/331 X |
| 5,526,711 | 6/1996 | Stine ........................................ 74/331 |
| 5,546,823 | 8/1996 | Stine et al. ............................. 74/331 |
| 5,557,978 | 9/1996 | McAskill ................................. 74/331 |
| 5,592,851 | 1/1997 | Bates et al. . |
| 5,624,350 | 4/1997 | Bates . |
| 5,653,143 | 8/1997 | Langevin ............................. 74/333 X |
| 5,679,096 | 10/1997 | Stine et al. ........................... 74/325 X |

Primary Examiner—Charles A. Marmor
Assistant Examiner—Roger Pang
Attorney, Agent, or Firm—Howard D. Gordon

[57] ABSTRACT

A mechanical transmission (14) having a plurality of ratios (first-twelfth) and an automated system (10) utilizing same, has an upper group of ratios (seventh-twelfth) having a relatively small average ratio step (13%) compared to the average ratio steps (30%–40%) of comparable transmissions. This allows high-speed operation (35–70 mph) at or very nearing desired engine speed (112), emulating the characteristics of a CVT.

3 Claims, 6 Drawing Sheets

| SPEED | RATIO | MAIN SECTION GEAR | SPLITTER SECTION GEAR | RANGE SECTION GEAR | STEP |
|---|---|---|---|---|---|
| 1 | 11.58 | 80 | 100 | 104 | |
| | | | | | 51% |
| 2 | 7.69 | 78 | 100 | 104 | |
| | | | | | 49% |
| 3 | 5.15 | 76 | 100 | 104 | |
| | | | | | 47% |
| 4 | 3.51 | 74 | 100 | 104 | |
| | | | | | 35% |
| 5 | 2.59 | 80 | 100 | 102 | |
| | | | | | 43% |
| 6 | 1.94 | 78 | 100 | 102 | |
| | | | | | 33% |
| 7 | 1.46 | 76 | 100 | 102 | |
| | | | | | 12% |
| 8 | 1.30 | 76 | 102 | 102 | |
| | | | | | 15% |
| 9 | 1.12 | 54 | 100 | 102 | |
| | | | | | 12% |
| 10 | 1.00 | 54 | 102 | 102 | |
| | | | | | 13% |
| 11 | 0.88 | 74 | 100 | 102 | |
| | | | | | 12% |
| 12 | 0.79 | 74 | 102 | 102 | |

SHIFT PATTERN

| GEAR | TEETH |
|------|-------|
| 54 | 54 |
| 62 | 61 |
| 74 | 48 |
| 64 | 69 |
| 76 | 54 |
| 66 | 47 |
| 78 | 60 |
| 68 | 35 |
| 80 | 62 |
| 70 | 27 |
| 82 | 40 |
| 72 | 17 |
| 100 | 34 |
| 94 | 43 |
| 102 | 32 |
| 96 | 36 |
| 104 | 60 |
| 98 | 17 |

| Speed | Ratio | Main Section Gear | Splitter Section Gear | Range Section Gear | Step |
|---|---|---|---|---|---|
| 1 | 11.58 | 80 | 100 | 104 | |
| | | | | | 51% |
| 2 | 7.69 | 78 | 100 | 104 | |
| | | | | | 49% |
| 3 | 5.15 | 76 | 100 | 104 | |
| | | | | | 47% |
| 4 | 3.51 | 74 | 100 | 104 | |
| | | | | | 35% |
| 5 | 2.59 | 80 | 100 | 102 | |
| | | | | | 43% |
| 6 | 1.94 | 78 | 100 | 102 | |
| | | | | | 33% |
| 7 | 1.46 | 76 | 100 | 102 | |
| | | | | | 12% |
| 8 | 1.30 | 76 | 102 | 102 | |
| | | | | | 15% |
| 9 | 1.12 | 54 | 100 | 102 | |
| | | | | | 12% |
| 10 | 1.00 | 54 | 102 | 102 | |
| | | | | | 13% |
| 11 | 0.88 | 74 | 100 | 102 | |
| | | | | | 12% |
| 12 | 0.79 | 74 | 102 | 102 | |

*FIG. 5*

MECHANICAL TRANSMISSION WITH REDUCED RATIO STEPS IN UPPER TRANSMISSION RATIOS

BACKGROUND OF THE INVENTION

1. Field of the Invention

The present invention relates to a vehicular multiple-speed mechanical transmission system, preferably a fully or partially automated mechanical transmission system, wherein the transmission has a plurality of upper ratios having a relatively small ratio step therebetween.

2. Description of the Prior Art

Multiple-speed vehicular mechanical transmissions for heavy-duty vehicles having 9, 10, 12, 13, 16, 18 or more forward gear ratios are well known in the prior art, as may be seen by reference to U.S. Pat. Nos. 4,754,665; 5,390,561 and 5,546,823, the disclosures of which are incorporated herein by reference. Such transmissions typically provided a relatively equal ratio step (i.e., the percentage change in ratio between adjacent ratios) across the entire ratio coverage (i.e., the difference between the highest and lowest speed forward ratios). The ratio steps were a compromise between providing a drivable vehicle and a desire to be in a ratio that will allow the engine to operate at or near a most fuel-efficient or otherwise desirable engine speed.

Automated mechanical transmission systems, including fully automatic systems, partially automatic systems and systems which automatically implement all or part of a manually requested shift, also are well known in the prior art, as may be seen by reference to U.S. Pat. Nos. 4,361,060; 4,648,290; 4,596,986; 4,873,881; 5,406,861 and 5,592,851, the disclosures of which are incorporated herein by reference. Automatic clutch controls for such systems also are well known in the prior art, examples of which are disclosed in U.S. Pat. Nos. 4,081,065; 5,403,249 and 5,624,350, the disclosures of which are incorporated herein by reference.

So-called continuously or infinitely variable transmissions ("CVT") for vehicular use also are known in the prior art. Examples of CVTs may be seen by reference to U.S. Pat. Nos. 5,108,352; 5,081,877 and 4,487,085. The advantages of a CVT is that the ratio may be continuously varied, not just in finite steps, to always cause the engine to operate at or very near the desired engine speed. These transmissions have not been commercially successful, especially for heavy-duty vehicles, as they tend to be limited in capacity, of unknown or unsatisfactory reliability, complicated and/or expensive.

SUMMARY OF THE INVENTION

In accordance with the present invention, a mechanical transmission system, preferably an at least partially automated transmission system, is provided which overcomes or minimizes the drawbacks of the prior art by providing the known simplicity and reliability of mechanical countershaft or lay shaft transmissions and, in the higher, most-used ratios, the ability to emulate a CVT by operating with the engine at or very near the desired engine speed thereof. This is accomplished by providing a mulitple-ratio transmission, preferably a compound transmission having at least nine or more forward speed ratios, wherein the upper ratios have relatively very narrow ratio steps, such as 10% to 15% steps, as compared to the typical 30% to 40% steps in comparable prior art transmissions.

As providing such a transmission system may require a non-traditional shift pattern (i.e., not a typical multiple-H or repeat-H type shift pattern) and/or more frequent than typically expected shifting in the upper ratios, the preferred embodiment of the present invention, while not so limited, is an at least partially automated transmission system.

Accordingly, it is an object of the present invention to provide a relatively simple, inexpensive and reliable mechanical transmission system suitable for heavy vehicle usage, preferably an automated mechanical transmission system, which in the higher gear ratios will emulate a CVT.

This and other objects and advantages of the present invention will become apparent from a reading of the following description of the preferred embodiment taken in connection with the attached drawings.

BRIEF DESCRIPTION OF THE DRAWINGS

FIG. 5 is a chart illustrating the ratios, engaged gears of each forward speed and ratio step between the forward speed ratios of the transmission of FIG. 2.

DESCRIPTION OF THE PREFERRED EMBODIMENT

Certain terminology will be used in the following description for convenience only and will not be limiting. The words "upwardly," "downwardly," "rightwardly" and "leftwardly" will designate directions in the directions to which reference is made. The words "inwardly" and "outwardly" will refer respectively to directions toward and away from the geometric center of the device and designated parts thereof. Said terminology will include the words above specifically mentioned, derivatives thereof and words of similar import.

Figure 1:
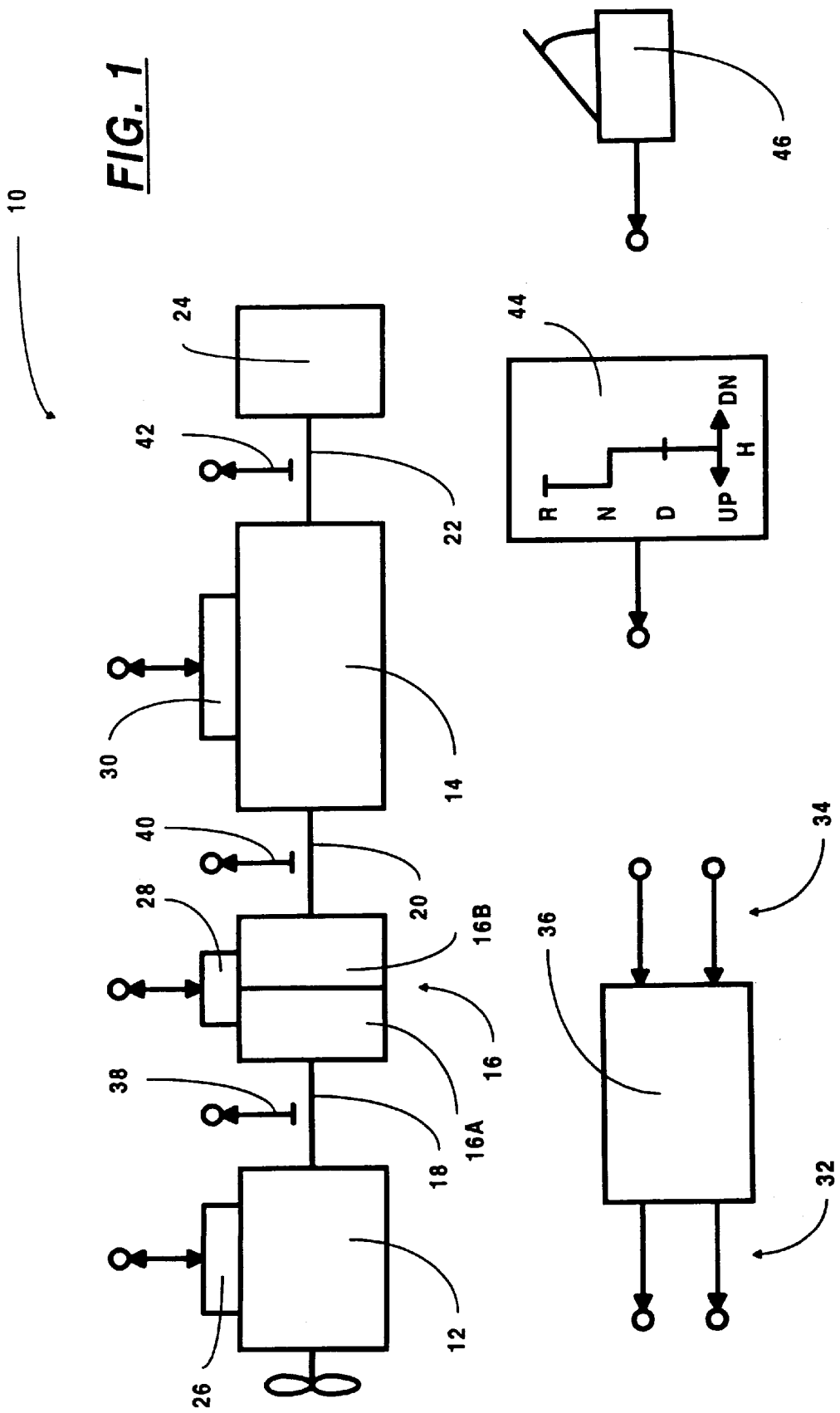
FIG. 1 is a schematic illustration of an automated mechanical transmission system according to the present invention.

A vehicular automated mechanical transmission system 10 utilizing the present invention is schematically illustrated in FIG. 1. Fully and partially automated mechanical transmission systems are well known in the prior art, and examples thereof may be seen by reference to aforementioned U.S. Pat. Nos. 4,361,060; 4,595,986; 4,648,290; 4,873,881; 5,406,861 and 5,592,851.

Vehicular automated mechanical transmission system 10 includes a fuel-controlled engine 12, such as a well-known electronically controlled diesel engine, which drives a compound mechanical transmission 14 through a coupling, such as a friction master clutch 16. The engine 12 includes an output member 18, which drives the input members 16A of the master clutch 16, which are selectively engaged to and disengaged from the output members 16B, which are carried on the transmission input shaft 20. The output shaft 22 of transmission 14 is adapted for driving connection to an appropriate vehicle component, such as the differential of a drive axle 24, a transfer case or the like, as is well known in the prior art. Automated transmission system 10 also may include an engine controller 26, a clutch actuator 28 and a transmission actuator 30. Clutch 16 may be totally automatically controlled, may be automatically controlled except for start-from-stop operation, or may be entirely manually controlled. Actuators 26, 28 and/or 30 preferably accept command output signals 32 from and/or provide input signals 34 to a microprocessor-based control unit 36. Sensors 38, 40 and 42 may be utilized to provide input signals indicative of the rotational speed of the engine 12, transmission input shaft 20 and transmission output shaft 22, respectively. Various other devices, such as a driver control console 44 and a throttle position sensor 46, may be utilized to provide input signals to the controller 36. System 10 will also include sources (not shown) of electrical, pneumatic and/or hydraulic power.

Drive train components and controls therefor of the type described above are known in the prior art and may be appreciated in greater detail by reference to U.S. Pat. Nos. 4,595,786; 4,576,065; 4,445,393 and 4,850,236. The sensors 38, 40, 42, 44 and 46 may be of any known type of construction for generating analog or digital signals proportional to the parameters monitored thereby. Similarly, operators 26, 28 and 30 may be of any known electric, pneumatic or electropneumatic type for executing operations in response to command output signals 32 from the central processing unit 36. In addition to the direct inputs to the central processing unit, the central processing unit may be provided with circuitry for differentiating the input signals from the sensors to provide a calculated signal indicative of the rate of change thereof. The processing unit 36 also may be provided with circuitry, logic rules and/or stored data for comparison of the input signals from sensors 40 and 42 to verify and/or identify that the transmission 14 is engaged in a particular gear ratio.

As is known, the various sensors, actuators and control unit 36 may communicate over an electronic data link conforming to an industry standard, such as SAE J-1922, SAE J-1939 or ISO 11898.

Figure 2:
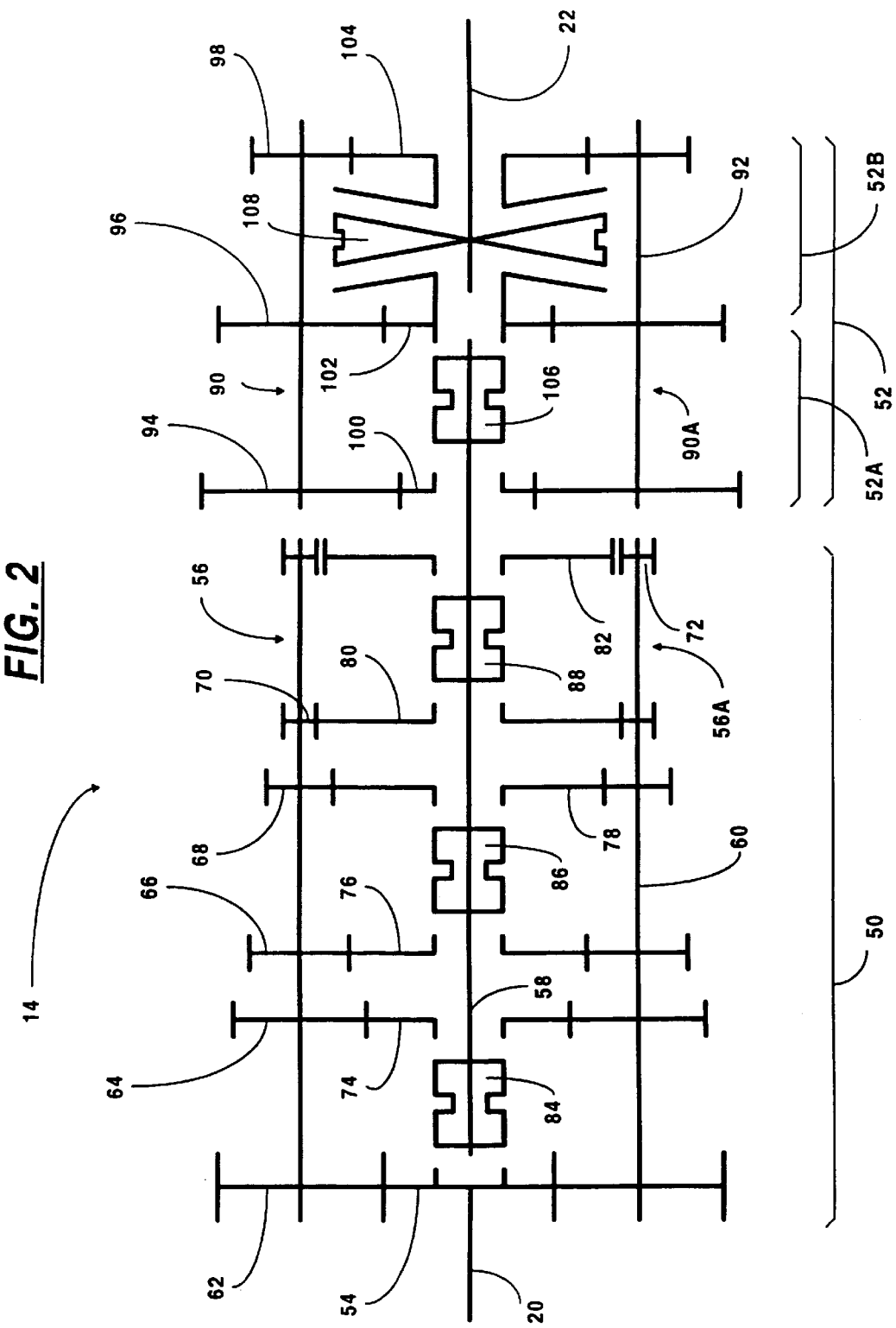
FIG. 2 is a schematic illustration of a mechanical transmission according to the present invention.

The structural details of compound mechanical transmission 14 are schematically illustrated in FIG. 2. Transmissions similar to the mechanical compound transmission 14 are well known in the prior art and may be appreciated by reference to U.S. Pat. Nos. 3,105,395 and 3,283,613, the disclosures of which are incorporated herein by reference, as well as by reference to aforementioned U.S. Pat. Nos. 4,754,665; 5,390,561 and 5,546,823.

Transmission 14 is a compound mechanical transmission comprising a main transmission section 50 connected in series with an auxiliary transmission section 52. Auxiliary transmission section 52 includes a splitter section 52A and a range section 52B, the structural details and advantages of which are disclosed in aforementioned U.S. Pat. Nos. 4,754,665 and 5,390,561.

In main transmission section 50, the input shaft 20 carries an input gear 54 for simultaneously driving a plurality of substantially identical main section countershaft assemblies 56 and 56A at substantially identical rotational speeds. The two substantially identical main section countershaft assemblies are provided on the diametrically opposite sides of a main shaft 58, which is generally coaxially aligned with input shaft 20 and output shaft 22. Each of the countershaft assemblies comprises a countershaft 60 supported by bearings (not shown) in a transmission housing (not shown). Each of the countershafts is provided with an identical grouping of countershaft gears 62, 64, 66, 68, 70 and 72, fixed for rotation therewith. A plurality of main shaft gears 74, 76, 78, 80 and 82 surround the main shaft 58 and are selectively clutchable, one at a time, to the main shaft 58 for rotation therewith by sliding jaw clutch collars 84, 86 and 88, as is well known in the prior art. Clutch collar 84 also may be used to clutch input gear 54 to main shaft 58 to provide a direct driving relationship between the input shaft 20 and the main shaft 58.

Typically, sliding clutch collars 84, 86 and 88 are axially positioned by means of shift forks (not shown) associated with the acuator 30. Clutch collars 84, 86 and 88 may be of any well-known, double-acting, non-synchronized or synchronized jaw clutch type.

Main section main shaft gear 82 is the reverse gear and is in continuous meshing engagement with countershaft gear 72 by means of conventional intermediate idler gears (not shown). As is known, sliding jaw clutches 84, 86 and 88 are 3-position clutches in that they may be positioned in a centered, non-engaged position, as illustrated, or in a fully rightwardly engaged or fully leftwardly engaged position.

Auxiliary transmission section 52 includes two substantially identical auxiliary countershaft assemblies 90 and 90A, each comprising an auxiliary countershaft 92 supported by bearings (not shown) in the transmission housing (not shown) and carrying three auxiliary section countershaft gears 94, 96 and 98 fixed for rotation therewith. Auxiliary countershaft gears 94 are constantly meshed with and support auxiliary section splitter gear 100, which surrounds main shaft 58. Auxiliary countershaft gears 96 are constantly meshed with and support auxiliary section splitter/range gear 102, which surrounds the output shaft 22 at the end thereof adjacent the coaxial rear end of main shaft 56. Auxiliary section countershaft gears 98 are constantly meshed with and support auxiliary section range gear 104, which surrounds the output shaft 22. A sliding 2-position jaw clutch collar 106 is fixed to the main shaft 58 for rotation therewith and is utilized to selectively couple either the splitter gear 100 or the splitter/range gear 102 to the main shaft 58, while a 2-position synchronized jaw clutch assembly 108 is fixed to the output shaft 22 for rotation therewith and is utilized to selectively couple either the splitter/range gear 102 or the range gear 104 to the output shaft 22. Accordingly, sliding clutch 106 is utilized to determine the gear ratio of splitter section 52A, while sliding synchronized clutch assembly 108 is utilized to determine the ratio of the range section 52B of the auxiliary section 52. As more fully described in aforementioned U.S. Pat. Nos. 4,754,665 and 5,390,561, the auxiliary section 52 thus defines three gear layers and provides four selectable ratios for the auxiliary section 52.

Although transmission 14 has a main transmission section 50 providing five potential forward speed ratios and auxiliary transmission section 52 provides four potential transmission ratios, which would yield a theoretically available twenty forward speed ratios, only twelve of the theoretically available ratios are practically utilized for the transmission system of the present invention.

Figures 3, 4:
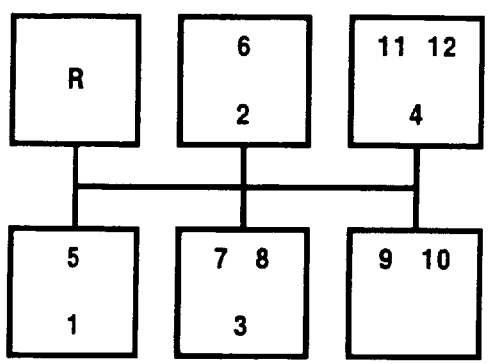
FIG. 3 is a schematic illustration of the shift pattern for the transmission of FIG. 2.
FIG. 4 is a chart illustrating the number of gear teeth on the gears of the transmission of FIG. 2.

FIG. 3 illustrates the shift pattern utilized to obtain the twelve forward speeds and and reverse ratios for the transmission 14 of the present invention. As may be seen, the shift pattern necessary to obtain the twelve forward speed ratios is a non-standard shift pattern and is best implemented in an at least partially automated transmission system wherein the transmission shift actuator 30 operating under command output signals 32 will shift the transmission automatically in response to shift requests generated by the controller logic and/or requested by the operator via the control module 44. It is noted that operator control module 44 includes both a "D" position wherein gear ratios are automatically selected by the controller logic and an "H" position wherein the operator may manually select up- and downshifts, which are then automatically implemented in accordance with output signals issued by controller 36.

FIG. 4 illustrates the gear teeth on each of the gears of transmission 14, while FIG. 5 illustrates the various ratios between input and output shaft rotational speed for each transmission forward speed ratio, indicates which of the main section, splitter section and range section gears are engaged for each speed ratio, and indicates the percentage step between the adjacent speed ratios.

In a typical 10-, 12-, 16- or 18-forward-speed transmission for a heavy-duty vehicle, the ratio steps usually are generally equal between the speed ratios throughout the entire ratio coverage of the transmission and average about 30% to 40% steps. As may be seen by reference to FIG. 5, the ratio steps in the lower grouping of ratios, i.e., the first through sixth ratio steps, are considerably larger than the ratio steps in the higher group of speeds, i.e., seventh through twelfth speeds, of transmission 14. The ratio steps between the seventh and twelfth forward speeds averages about 13% steps. These upper ratios, seventh through twelfth forward speeds, represent a high percentage of vehicle operation and are the speed ratios utilized by a heavy-duty vehicle in operation between about 35 mph and 70 mph. By providing the relatively narrow ratio steps in this higher range of ratios, the vehicle will spend a high percentage of its operation operating at or very near the peak efficiency engine speed for the vehicle power train.

Figure 6:
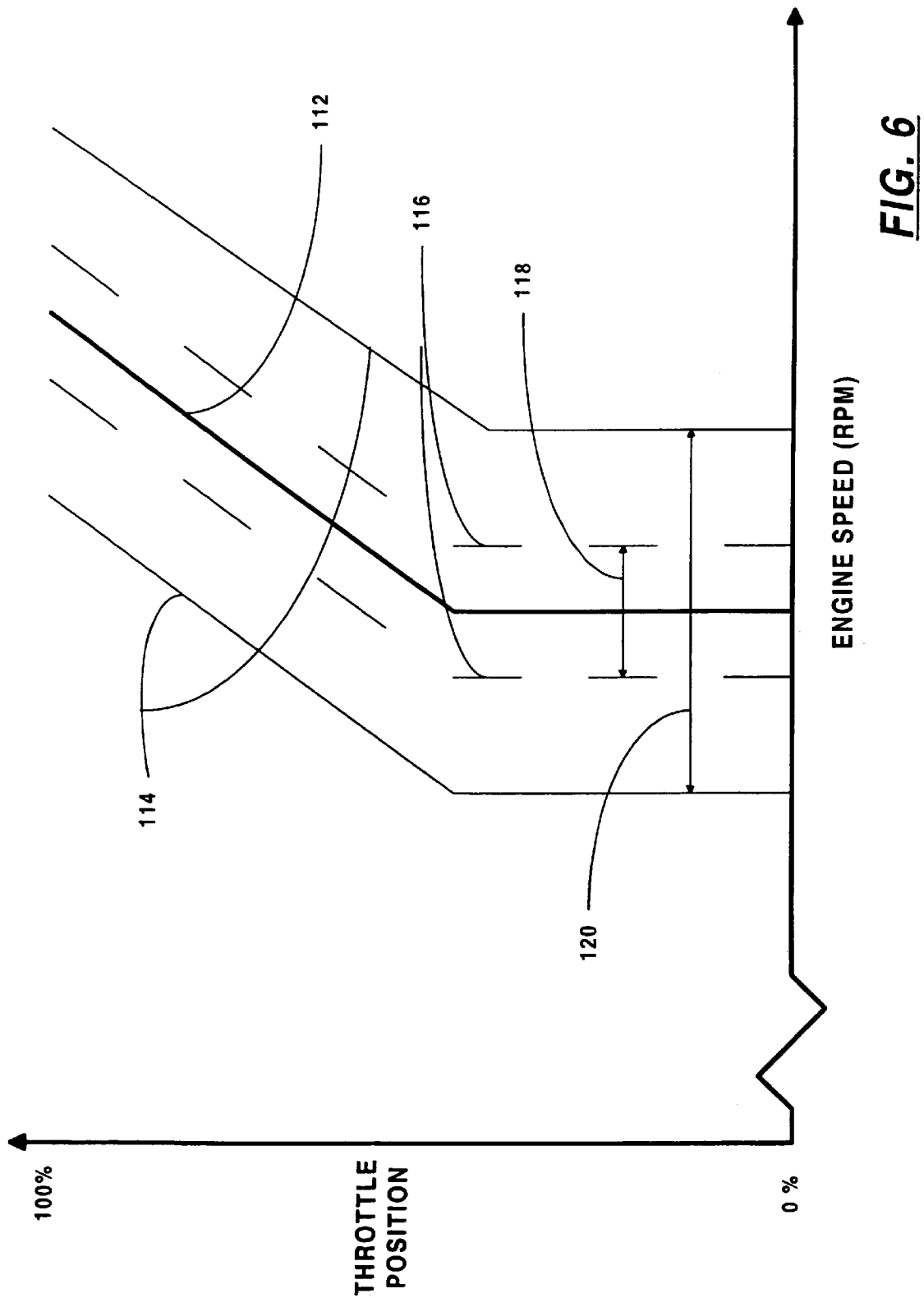
FIG. 6 is a graphical representation of the present invention.

FIG. 6 is a schematic illustration, not necessarily in accurate proportion, of the advantages of the present invention. Assuming that line 112 represents the peak efficiency engine speed at various sensed parameters (such as, for example, throttle position). Lines 114 will represent upshift and downshift points for a transmission having about a 40% step, while lines 116 will represent the upshift and downshift points for a transmission having ratio steps of about 13%. By utilizing relatively smaller ratio steps, the transmission will operate in a much smaller band 118 of engine speeds about the peak efficiency engine speed 112, as compared to the band 120 of engine speeds operated in for transmissions having ratio steps in accordance with the typical prior art. Thus, when operating in the upper range of ratios, transmission 14 will be operating at or very close to the peak efficiency engine speed and, thus, emulate the advantage obtained by utilizing a CVT-type transmission.

Figure 7:
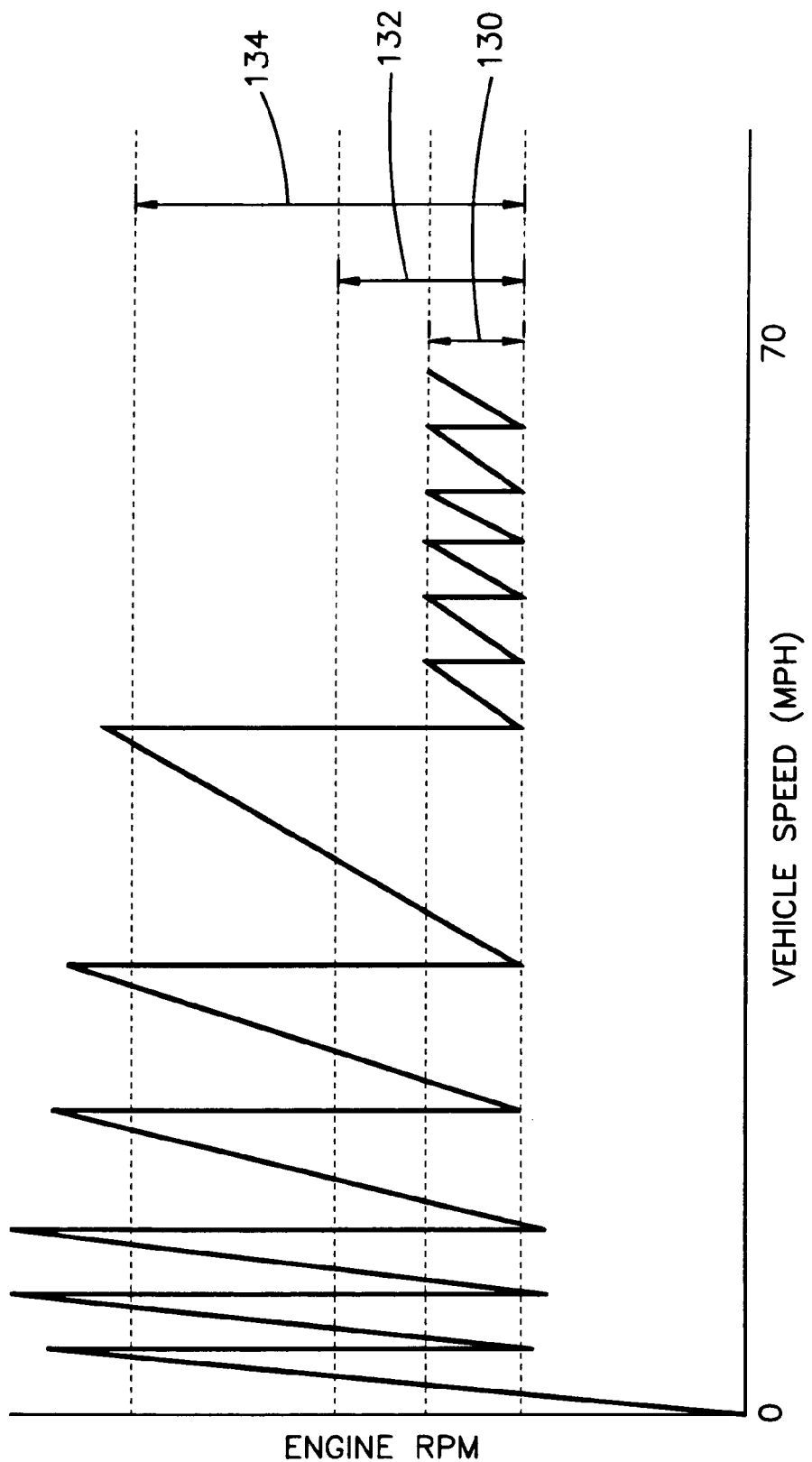
FIG. 7 is a chart illustrating the shift points for the transmission of FIG. 2.

The shift points for transmission 14 are illustrated in FIG. 7. Range 130 represents the operating range of engine speed of transmission 14 in the highest range (seventh-twelfth) of ratios, while ranges 132 and 134 represent typical ranges in a conventional 14–16 speed transmission and 10-speed transmission, respectively.

In an alternate embodiment, a transmission automated in only the two upper ratios (i.e., a "Top-2" type transmission) (see, for example, U.S. Pat. Nos. 4,722,248 and 4,850,236) may utilize only a reduced ratio step in the upper two ratios.

Accordingly, the present invention provides a relatively simple and inexpensive transmission system having the reliability and capacity associated with mechanical transmissions and also providing the advantages associated with the use of continuously variable transmissions.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. An automated vehicular mechanical transmission system (10) comprising an internal combustion engine (12) drivingly connected to a mechanical transmission (14) by a coupling (16), and an electronic processor (36) for receiving input signals (34) and processing same according to logic rules to issue command output signals (32) to system actuators, said system characterized by:

said transmission being a compound transmission comprising a main transmission section (50) connected in series with an auxiliary transmisison section (52), said transmission having a plurality of selectable forward drive ratios (1st–12th) comprising an upper group (7th–12th) of at least three consecutive ratios for high vehicle ground speed operation, and a lower group (1st–6th) of at least four consecutive ratios for operation at vehicle ground speeds lower than the vehicle ground speeds operated at while in said upper group of ratios, each of said upper and lower groups having an average ratio step between the consecutive ratios therein, no ratio within each of said upper and lower groups having a ratio step to a next consecutive ratio within the group which is greater than twice as large as the average ratio step between the consecutive ratios of the group, no ratio within each of said upper and lower groups having a ratio step to the next consecutive ratio within the group which is greater than twice as large as any other ratio step between the consecutive ratios in the group, the average ratio step between the consecutive ratios in said lower group being at least twice as large as the average ratio step between consecutive ratios in said upper group, the average ratio step between the consecutive ratios in said upper group of ratios being about 10% to 20% and the average ratio step between the consecutive ratios in said lower group of ratios being in the range of 30% to 50%; and said processor having at least one mode of operation for automatic shifting between at least the ratios in said upper group of ratios.

2. The system of claim 1 wherein said upper group of ratios has at least four ratios and is intended for vehicle operation at speeds of about 35 MPH to 65 MPH or greater.

3. The system of claim 1 wherein said transmission has a non-H shift pattern.

* * * * *